United States Patent [19]

Horkey

[11] 4,187,943

[45] Feb. 12, 1980

[54] DRAG CHAIN LINKS

[76] Inventor: Edward J. Horkey, 835 W. 22nd St., Tempe, Ariz. 85282

[21] Appl. No.: 960,947

[22] Filed: Nov. 15, 1978

[51] Int. Cl.² .................. B65G 19/24; B65G 19/08
[52] U.S. Cl. ............................ 198/730; 198/733
[58] Field of Search .............. 198/730, 731, 716, 733

[56] References Cited

U.S. PATENT DOCUMENTS

| 573,988 | 12/1896 | Levalley | 198/730 |
|---|---|---|---|
| 908,750 | 1/1909 | Conner | 198/730 |
| 1,555,577 | 1/1925 | Horner | 198/730 |
| 2,252,460 | 8/1940 | Sinden | 198/716 |
| 3,160,024 | 12/1964 | Mojonnier | 74/249 |
| 3,331,484 | 7/1967 | Williams | 198/717 |

Primary Examiner—Joseph E. Valenza
Assistant Examiner—Brian Bond
Attorney, Agent, or Firm—Warren F. B. Lindsley

[57] ABSTRACT

Drag type feed chains employing links interconnecting one with the other at positions sufficiently above the center lines of the links to increase the strength of the associated abrasion dragging surfaces of the links.

9 Claims, 9 Drawing Figures

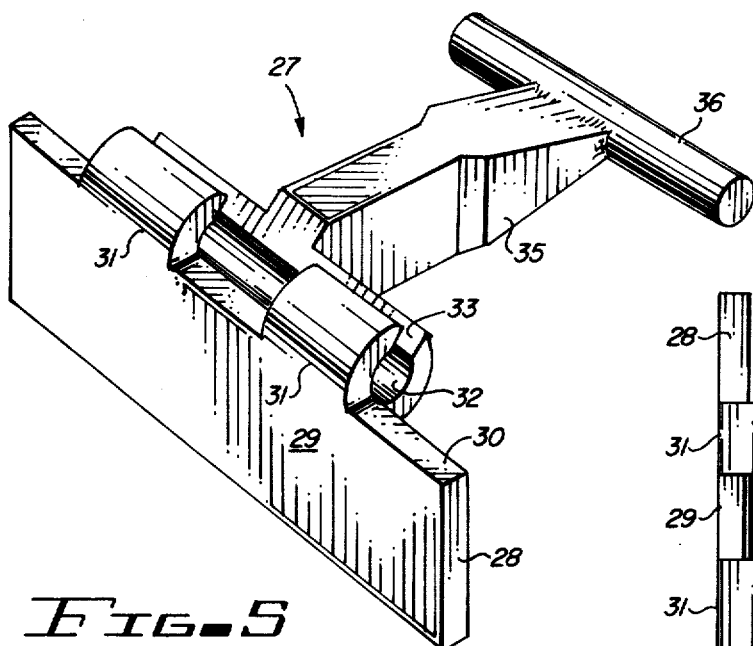
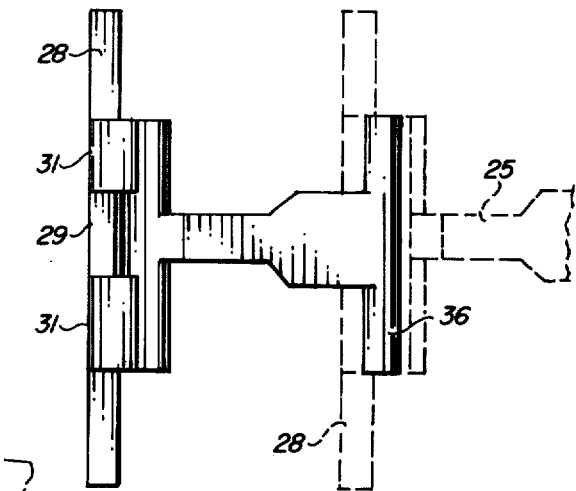
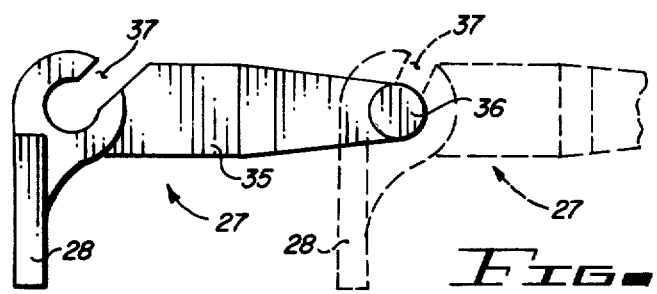
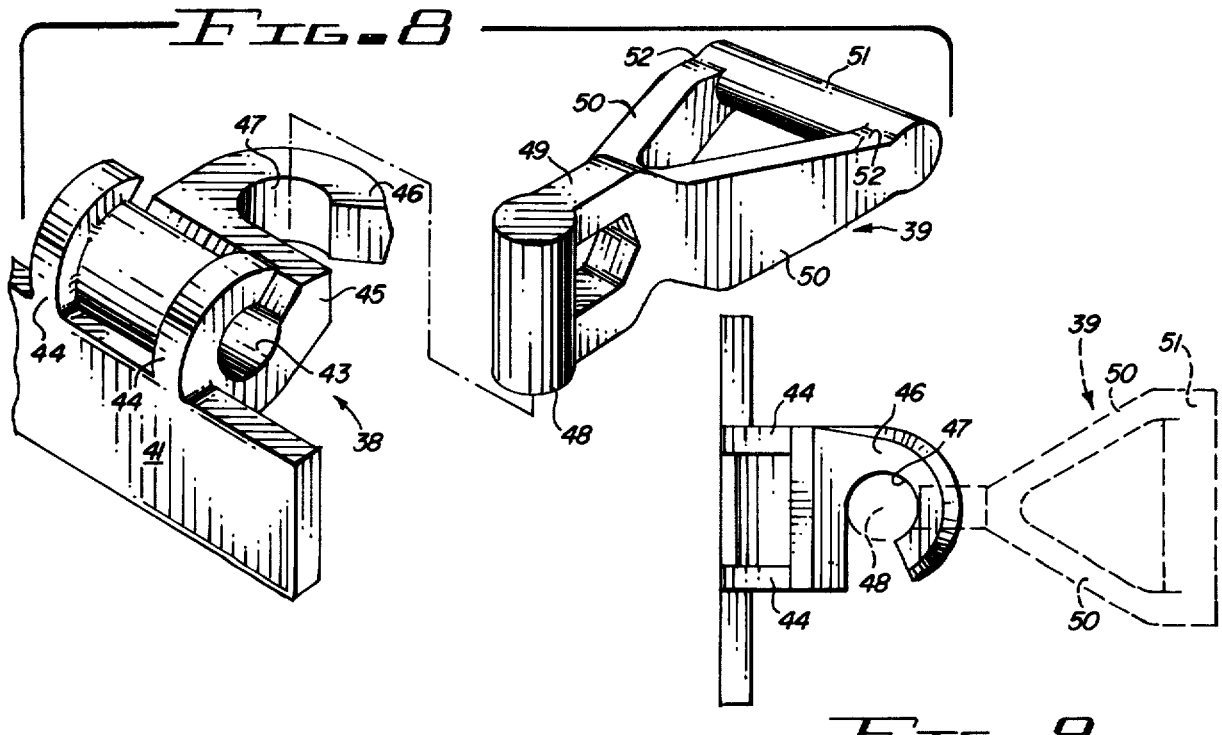

DRAG CHAIN LINKS

BACKGROUND OF THE INVENTION

This invention relates to abrasion resistant drag-type feed chains such as commonly employed in feeding comminuted materials to processing vessels in chemical, metallurgical and other processing industries which are particularly resistant to high temperature, corrosive environments.

In certain industries, it is necessary to feed granular or comminuted materials to processing vessels such as furnaces, reactors and the like. Sometimes it is possible to feed these materials to such equipment by means of screw conveyors, belts, and other conventional solids-handling apparatus. However, in certain instances, particularly where the solid material is highly abrasive and also where high operating temperatures and corrosive atmospheres are encountered, it is necessary to employ so-called "drag chains." Such drag chains are typically endless belts formed by interconnecting metal links which are specially constructed to withstand the severe conditions encountered. For example, such drag chains are commonly employed to feed concentrates or calcined ores to the reverberatory furnaces in copper smelters.

The dry materials, either concentrate or calcined ore, are fed to the reverberatory furnace in a modern copper smelter through relatively small ports located in the ceiling of the furnace. These ports are spaced along the sides of the furnace at appropriate locations to form piles of the solid material along the walls of the furnace. These piles melt at their base and are continually replenished by the addition of further solid material at the top of the pile. Drag chains are employed to transport the solid materials from their storage point along channels in the feeding ports in the ceiling of the furnace. The drag chains are almost constantly subjected to the very corrosive gases produced in the furnace and are further subjected to high temperatures from the furnace itself and from the hot solid materials being fed to the furnace. This combination of corrosive atmosphere, high temperature, and abrasive material being handled presents a serious maintenance problem, necessitating frequent repair and replacement of the drag chain.

Further, the torque applied to the pushing or dragging surfaces of the link have weakened and ruptured these links resulting in shut down and repairs of the drag chains and thereby interrupting the flow of the raw material dragged by these chains.

PRIOR ART

U.S. Pat. No. 3,331,484 discloses an abrasion resistant drag-type feed chain which employs similar chain links. However, the center line of these links is so close to or aligned with the center of the slots in the interconnecting links that the body of the abrasion material of the dragging portion of the chain link adjacent the slots ruptures frequently in use thereby requiring shut down and repair of the drag chain.

U.S. Pat. Nos. 3,160,024 and 573,988 disclose link members wherein the interconnecting slots and associated pins of adjacent links are positioned along the center lines of the interconnected links forming the conveyor.

Accordingly, drag chains especially adapted to withstand the severe operating conditions encountered in feeding abrasive material to various pieces of processing equipment are needed.

SUMMARY OF THE INVENTION

In accordance with the invention claimed, improved abrasion resistant drag type feed chains and links therefor are provided wherein the center of the hole or slot for interconnecting with a bar journal of an associated link is on the opposite side of the center line of the link from its dragging surface thereby increasing the strength of the dragging portion and surface of the link.

Accordingly, it is a principal object of the present invention to provide a drag chain for feeding abrasive materials to processing apparatus.

It is another object of the invention to provide such a drag chain which will withstand severe environmental conditions and heavy feed loads to a degree not possible in the drag chains of the prior art.

Yet another object of the invention is the provision of a drag chain which is especially adapted to feeding hot solid material such as calcined ore to the reverberatory furnace in a copper smelter.

A still further object of the invention is the provision of a drag chain for feeding a copper reverberatory furnace which is adapted to resist clogging by the hot solid materials.

Yet another object of the invention is the provision of a drag chain which can be readily repaired, or replaced, with a minimum of down time.

Yet another object of the invention is the provision of a novel, one-piece link for a drag chain which may be manufactured by making a single casting.

These and other further and more specific objects and advantages of the present invention will be apparent from the following detailed description thereof and the accompanying drawings.

BRIEF DESCRIPTION OF THE DRAWING

The present invention may be more readily described by reference to the accompanying drawing in which:

FIG. 5 is a perspective view of a further modification of the links shown in FIGS. 1-4;

FIG. 6 is a top view of the link shown in FIG. 5 together with an associated link connected thereto shown in dash lines;

FIG. 7 is a side view of FIG. 6;

FIG. 8 is an exploded perspective view of a further modification of the links shown in FIGS. 1-7 wherein link configurations permitting sideward pivotal movement between interconnected links is possible; and FIG. 9 is a top view of the interconnection of the links shown in FIG. 8 with one of the links shown in dash lines.

DESCRIPTION OF THE PREFERRED EMBODIMENT

In accordance with one embodiment of the present invention, a drag chain is provided utilizing a plurality of links, each link being formed of a single casting and adapted to be connected to other links without the expediency of a pin and/or pin retainer structure. A materials pushing surface is provided extending substantially perpendicular to a supporting surface permitting the linking bar journal to be supported in such a manner as to avoid the accumulation of an undue proportion of abrasive particles. This surface may be varied in frontal area for different applications. A connecting bar is cast integral with support arms extending from the journal rearwardly; the support arms are positioned above the supporting surface and are therefore prevented from the usual wear that causes weakening of the link.

Figure 1:
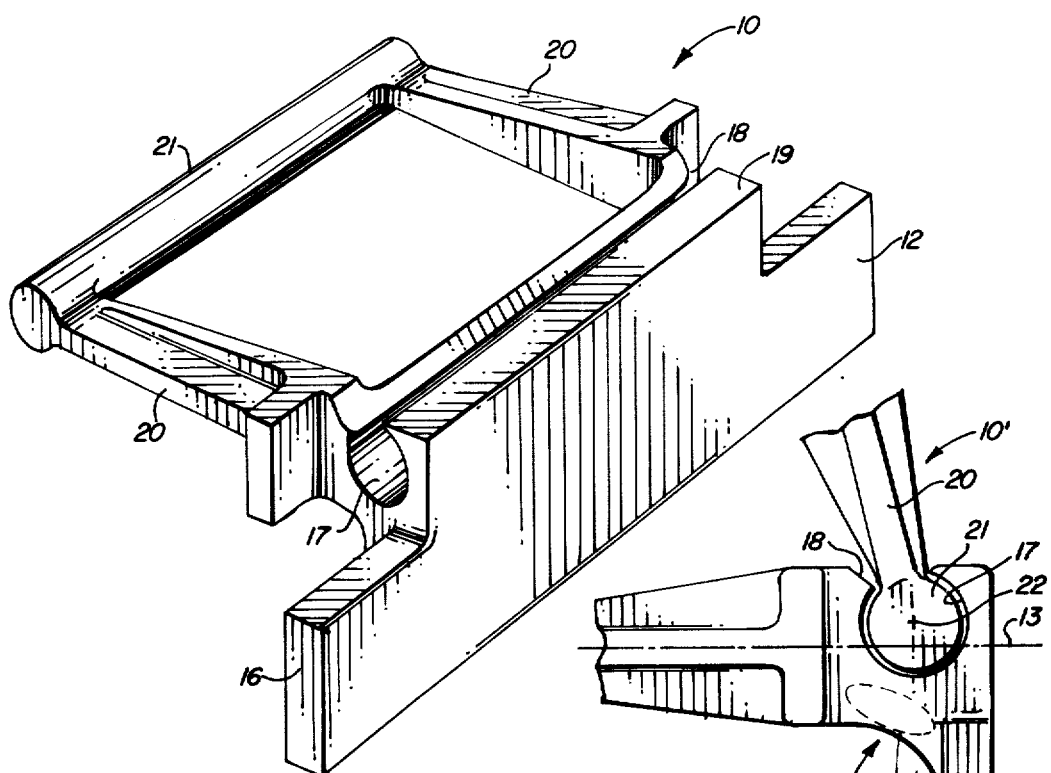
FIG. 1 is a perspective view of a link of a drag chain constructed in accordance with the teaching of the present invention.
Figure 2:
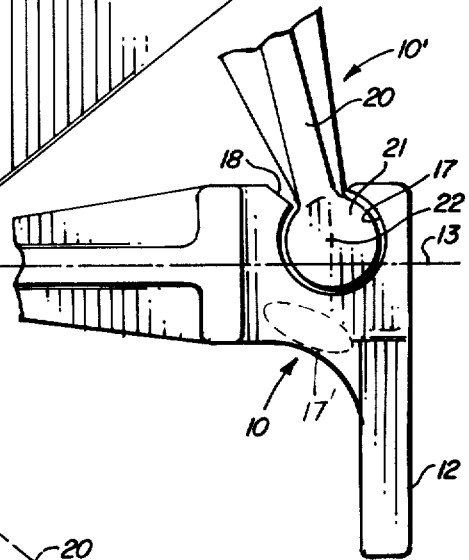
FIG. 2 is a partial end view of FIG. 1 showing the bar journal of an adjacent bar fitted into its receiving slot.
Figure 3:
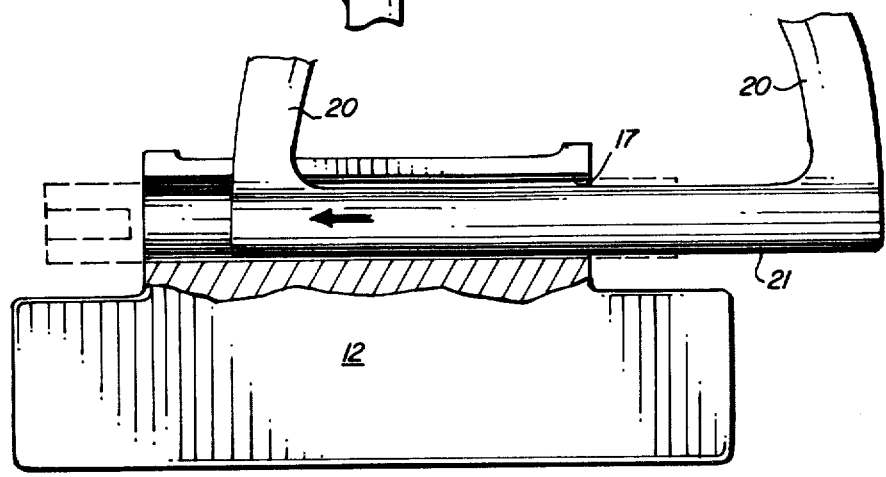
FIG. 3 is a partial right end view of the link shown in FIG. 1 illustrating the connection of bar journal with the bar of an adjacent link.

Referring more particularly to the drawings by characters of reference, FIGS. 1-3 disclose a pair of similar links 10, 10' of a drag chain with each link comprising a dragging or pushing surface 12 that extends upwardly and substantially perpendicular to the longitudinal axis or center line 13 of the links and drag chains assembled therefrom. An abrasion surface 14 is provided on the supporting edge 15 and side edge 16 of the blade furnishing the pushing surface 12.

A connecting bar journal 17 is formed having an axis substantially parallel to the pushing surface 12. A slot 18 extends from bar journal 17 outwardly of the top surface 19 of blade 16 and is tapered inwardly as it approaches the journal 17 to provide a means for guiding a connecting bar into the journal as well as provide an escape from the journal for abrasive particles entrapped therein. The slot is also tilted backwardly in relation to the material pushing surface 12 of the links to prevent the accumulation of abrasive particles and to provide a self locking force between successive links, thereby preventing the links from becoming disengaged. On a complete loop of links, the links comprising the return segment will have abrasive particles removed by gravity forces.

A pair of support arms 20 extend rearwardly from the material pushing surfaces 12 of the links terminating in an integral connecting bar 21 which joins the two support arms 20.

The connecting bars 21 are so dimensioned that they are readily journaled in the connecting bar journal of the adjacent drag chain link. It will be noted that the entire link is formed of a single casting and that the connecting bar forms a solid support structure between the two support arms. It should also be noted that the connecting bar and the support arms of the links are supported out of contact with the supporting and abrasive surface 14 of the blades 16 of the links 10, 10', thereby preventing the abrasive wear of the critical parts of the links.

Further, it should be noted that the longitudinal axis 22 of the journal 17 of the links is spaced above the longitudinal or center line 13 of the links so that the body of the casting forming the link between the journal 17 and the abrasive supporting surface 14, particularly in the area marked with the dotted lined ellipse 17' in FIG. 2, is increased over that used in the prior art to increase the shear strength of the link and its blade 16 at this point. Under heavy, pushing loads, prior art blades have been known to rupture at this point in their structures. Further, this feature is particularly desirable when the blade 16 and its abrasive surface 14 is the only supporting surface for the link. In prior art structures, separate abrasive surfaces were needed to support the link and provide the necessary shear strength therefor.

As noted from FIG. 3, the adjacent links are interconnected by sliding connecting bar 21 of one link into the other from one or the other of the ends of the bar journal 17 of the adjacent link.

The structure thus provided by the present invention is less expensively manufactured through the utilization of a single casting without the previously expensive provision of a separate pin and pin bearing. The connection bar is dimensioned to loosely fit within the journal of the adjacent link while the links are rapidly and effectively joined through the expedient of inserting a connecting bar of one link through the journal slot and into the journal of an adjacent link. The links may then rapidly be replaced or removed for repair without time consuming, and sometimes destructive, disassembly of pin and pin retainer structures. The abrasion surface permits longer life by adding material at the point of shear stress while further increasing life by elevating the critical portions of the link out of contact with the supporting surface.

Figure 4:
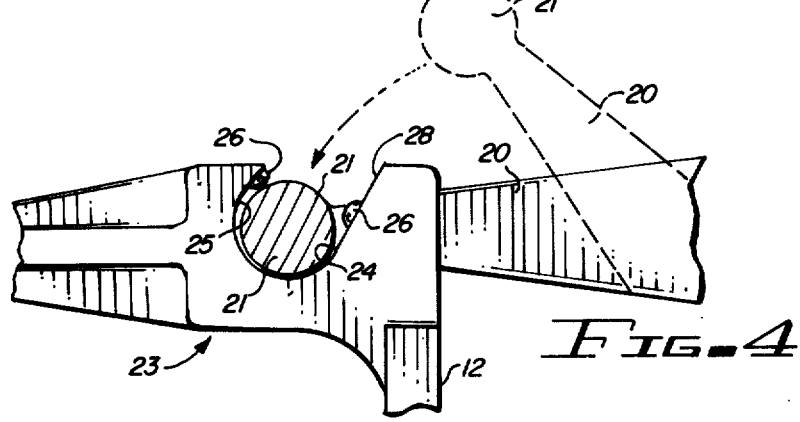
FIG. 4 is a partial view of a modification of the link shown in FIGS. 1-3 illustrating a wider mouth slot and welds within the mouth of the slot for holding the bar of an adjacent link therein for use in connecting the last two links in a looped assembly of links.

FIG. 4 illustrates a modification of the link structure shown in FIGS. 1-3 wherein link 23 comprises all of the link parts and configurations shown in FIGS. 1-3 which are given the same reference characters except that its bar journal 24 is slotted with parallel surfaces at 25 to open upwardly and outwardly toward the pushing surface 12 to comprise a marker link for the final connection of the last two links in an assembled loop of links. Two or more weld buttons 26 or other devices are provided along the slotted opening 25 leading into the bar journal 24 to aid in holding the connecting bar 21 of an associated link in seated arrangement in the journal.

FIGS. 5-7 disclose a further modification of the link configurations shown in FIGS. 1-4 wherein the links 27 comprise an integral pushing blade 28 having a surface 29 for engaging the material being moved. Blade 28 is formed along its upper edge 30 to form two spaced parts 31 of an integral cylindrically formed bar journal 12. The remaining portion of the journal is formed by a cylindrical portion 33 extending outwardly of the back 34 of blade 28. Extending outwardly and perpendicularly away from portion 33 and along the longitudinal axis of the link is an arm 35 having a connecting bar 36 extending perpendicular to its longitudinal axis and forming a T-shaped configuration with arm 35.

It should be noted that the adjacent links shown in FIGS. 5-7 may be interconnected by sliding the connecting bar 36 of one link into the journal 32 of another link. As an alternative to this form of connection, a master link could be used where the slotted tapered opening between portions 31 and 33 of the journal may form a larger slotted opening 37 than the similar slotted opening in adjacent links. Thus, the bar of the adjacent link may be merely dropped into journal 32 rather than slid in one end thereof. Weld beads, roll pins or other devices may then be added to hold the adjacent link in place.

FIGS. 8-9 disclose a further modification of the links shown in FIGS. 1-7 wherein a link 38 is pivotally connectable with a link 39 so as to permit the drag chain formed by such links to move in an arcuate configuration and around corners in a conveyor path.

As shown, link 38 comprises the usual pushing blade 40 having a pushing surface 41 and abrasive edge and supporting surface 42. A bar journal 43 is provided by two arcuate spaced portions 44 in cooperation with a portion 45. The journal opens upwardly, outwardly and away from the pushing surface 41 of blade 40. A flange 46 forming a part of portion 45 is arranged to extend substantially perpendicular to blade 40 and parallel with its abrasive surface 42 and is provided with a slot or journal 47 for engaging with a connecting bar or pin 48 of link 39. Extending outwardly of the longitudinal axis of bar 48 is an arm 49 which extends outwardly therefrom in a V-shaped configuration to form support arms 50 for a connecting bar 51 extending between its spaced apart ends 52.

This link then is free to rotate about two axes mutually perpendicular to each other.

All links shown herein are provided with integral pushing blades. These blades may be varied in size and configuration. In addition, other surfaces or structures may be welded, bolted or screwed to the journal or blade to provide other required drag functions.

The novel links hereabove described are manufactured of a suitable corrosion resistant metal or alloy material; for example, stainless steel or the like. The specific metal or alloy to be employed will vary somewhat in accordance with the nature of the corrosion conditions encountered and, to some extent, will be determined by the operating temperature conditions. In a preferred embodiment of the invention, a chain such as described hereabove for feeding hot calcined ore to a copper reverberatory furnace is constructed of so-called "HH" high chrome stainless steel. Type 8630 alloy is a preferred material for use in feeding copper concentrates which are somewhat cooler when fed to the furnace.

Although but a few embodiments of the present invention have been illustrated and described, it will be apparent to those skilled in the art that various changes and modifications may be made therein without departing from the spirit of the invention or from the scope of the appended claims.

What is claimed is:

1. A link for a drag chain comprising:
    a material pushing blade having a substantially flat material engaging surface extending perpendicularly away from a supporting surface,
    a connecting bar journal extending substantially parallel to and rearwardly of the supporting surface,
    a journal slot extending upwardly and opening outwardly of said journal for receiving and guiding a connecting bar of an associated link into said journal,
    said slot tilted rearwardly from said pushing surface to prevent accumulation of abrasive materials in said journal, and for easy removal of abrasive materials in links making up the return portion of the loop,
    means comprising support arms extending rearwardly from said pushing surface out of contact with the supporting surface,
    a connecting bar formed integral with the free ends of said support arms, the longitudinal axis of which is substantially parallel with said pushing surface, and
    the longitudinal axis of said journal being spaced from and on the opposite side of the longitudinal axis of the link from the supporting surface for increasing the shear strength of the link.

2. The link set forth in claim 1 wherein:
    said journal comprises an integral part of said blade and said means.

3. The link set forth in claim 1 wherein:
    said slot is tapered to become narrower as the distance from said journal decreases.

4. The link set forth in claim 1 wherein:
    said support arms are substantially parallel to each other and to the supporting surface.

5. The link set forth in claim 4 wherein:
    said connecting bar has a cylindrical cross-sectional configuration.

6. The link set forth in claim 1 wherein:
    said blade comprises a T-shaped configuration with the leg portion of the T terminating in said journal and the edge of the cross member of the T forming an engaging supporting surface.

7. The link set forth in claim 6 wherein:
    the edges of adjacent interconnected links forming a drag chain comprising the only surfaces of the links engaging the supporting surface for the drag chain.

8. A link for a drag chain comprising:
    a substantially flat continuous material pushing blade having a material engaging surface extending perpendicularly away from a supporting surface,
    a connecting bar journal extending substantially parallel to and rearwardly of said material engaging surface,
    a journal slot extending upwardly and opening outwardly of said journal for receiving and guiding a connection bar of an associated link into said journal,
    said slot tilted rearwardly from said material engaging surface to prevent accumulation of abrasive materials in said journal,
    means extending rearwardly from said material engaging surface out of contact with the supporting surface,
    a connecting means comprising a bar pivotally connected to said means, the longitudinal axis of which is substantially parallel with the supporting surface, and
    the longitudinal axis of said journal being spaced from and on the opposite side of the longitudinal axis of the link from the supporting surface for increasing the shear strength of the link.

9. The link set forth in claim 8 wherein:
    said means comprises a flange defining a second journal slot having an axis extending substantially perpendicular to the supporting surface, and
    a pin comprising a part of said connecting means journaled in said second journal slot for providing a pivotal connection for said link.

* * * * *